United States Patent [19]

Tilse

[11] 4,370,578

[45] Jan. 25, 1983

[54] COIL/CORE ASSEMBLY WITH INTERFERENCE FIT

[75] Inventor: Wilhelm K. P. H. Tilse, Birkenfeld, Fed. Rep. of Germany

[73] Assignee: Timex Corporation, Waterbury, Conn.

[21] Appl. No.: 274,850

[22] Filed: Jun. 18, 1981

[51] Int. Cl.³ .......................................... H02K 15/08
[52] U.S. Cl. ........................................ 310/42; 29/596; 29/606; 310/49 R; 336/210
[58] Field of Search .................... 310/42, 49 R, 164; 29/596, 606; 335/250, 281, 282; 336/210, 212

[56] References Cited

U.S. PATENT DOCUMENTS 2,431,867 12/1947 Galla ................................. 336/210 X
2,550,501 4/1951 Sims ................................. 336/210 X
3,098,135 7/1963 Farmer ................................. 335/281
4,318,017 3/1982 Migeon et al. .................. 310/49 R X

FOREIGN PATENT DOCUMENTS 1272314 8/1961 France ................................. 336/210

*Primary Examiner*—John Gonzales
*Attorney, Agent, or Firm*—William C. Crutcher; Joseph A. Biela

[57] ABSTRACT

In an electric stepping motor, a pair of core members are held in intimate contact within the coil by outwardly extending coil-engaging means on the core members being in interference fit with inner turns of wire of the coil. No supplementary fastening means such as adhesive, screws or the like are required to provide the coil/core assembly.

4 Claims, 6 Drawing Figures

COIL/CORE ASSEMBLY WITH INTERFERENCE FIT

FIELD OF THE INVENTION

This invention relates to a coil/core assembly especially useful in an electric stepping motor and, more particularly, to an improved coil/core assembly for coupling to the stators of such a motor. An improved method for manufacturing the coil/core assembly is also disclosed.

DESCRIPTION OF THE PRIOR ART

Small electric stepping motors are known which may be driven by periodic pulses produced by a transistorized driving circuit or other well-known equivalent circuits. Regardless of the method by which it is driven, the stepping motor generally includes a main magnetic circuit formed of a permenently magnetized rotor and a magnetizable stator with a coil coupled to the driving circuit. In the past, the coil has been magnetically coupled to the stator via one or more magnetizable core members in the form of simple rectilinear or U-shaped steel or iron plates extending through the coil to the stators, for example, typical stepping motor constructions are illustrated in the Oudet U.S. Pat. No. 3,754,155 issued Aug. 21, 1973; the Schwarzschild U.S. Pat. No. 3,818,690 issued June 25, 1974; the Schwab et. al. U.S. Pat. No. 3,960,842 issued Jan. 14, 1975; the Kuwako et. al. U.S. Pat. No. 3,984,709 issued Oct. 5, 1976; the Kikuyama et. al. U.S. Pat. No. 3,989,967 issued Nov. 2, 1976; and the Oudet et. al. U.S. Pat. No. 4,079,279 issued Mar. 14, 1978.

Typically in the past, the coil has been wound on a form or molded carcass which contains a bore to receive the core members. In one known construction, two core members are inserted into the carcass from opposite directions. Then the coil and core members are made into an assembly by using mechanical fastening means such as screws, welding such as spot welding or gluing such as by applying epoxy adhesive between the components. When two or more core members are employed, it is especially important that good magnetic contact be established therebetween in order to provide an adequate magnetic circuit in the motor. The above-noted coil/core assembly techniques have proved less than satisfactory from the standpoint of either not providing the required magnetic contact between the cores or of being difficult to implement in a high volume production operation.

A copending application U.S. Ser. No. 109,593 entitled "Coil/Core Assembly and Assembly Process" filed Jan. 1, 1980 now abandoned, in the name of Jean P. Migeon and of common assignee herewith discloses winding a thermoplastic coated wire with the coating heated to a tacky condition on an arbor to unite the individual turns of wire into a self-supporting coil, inserting core members into the coil and compressing the components together at an elevated temperature to cause the coating to stick to and hold the core members in intimate contact within the coil.

SUMMARY OF THE INVENTION

An object of the present invention is to provide an improved coil/core assembly for a stepping motor of the type described wherein the core members are in intimate contact.

Another object of the present invention is to assemble the coil and core members in a simple one-step operation that requires no supplemental fastening means such as screws or adhesive to hold the components together with requisite contact therebetween.

Briefly stated, the present invention provides a coil/core assembly in which overlapping core members are held within the bore of a coil in intimate contact with one another by interference fit. Preferably, each core member includes coil-engaging means, in particular outwardly extending coil-engaging bumps, which effect an interference or friction fit with the inner turns of the coil forming the bore when the coil members are inserted into the bore.

The process of making the coil/core assembly involves inserting the core members into the coil, preferably simultaneously into opposite ends of the coil, until the coil-engaging means effect the desired interference fit to hold the core members and coil together with the core members in intimate contact. No supplemental fastening means is required.

DESCRIPTION OF THE PREFERRED EMBODIMENTS

Figure 1:
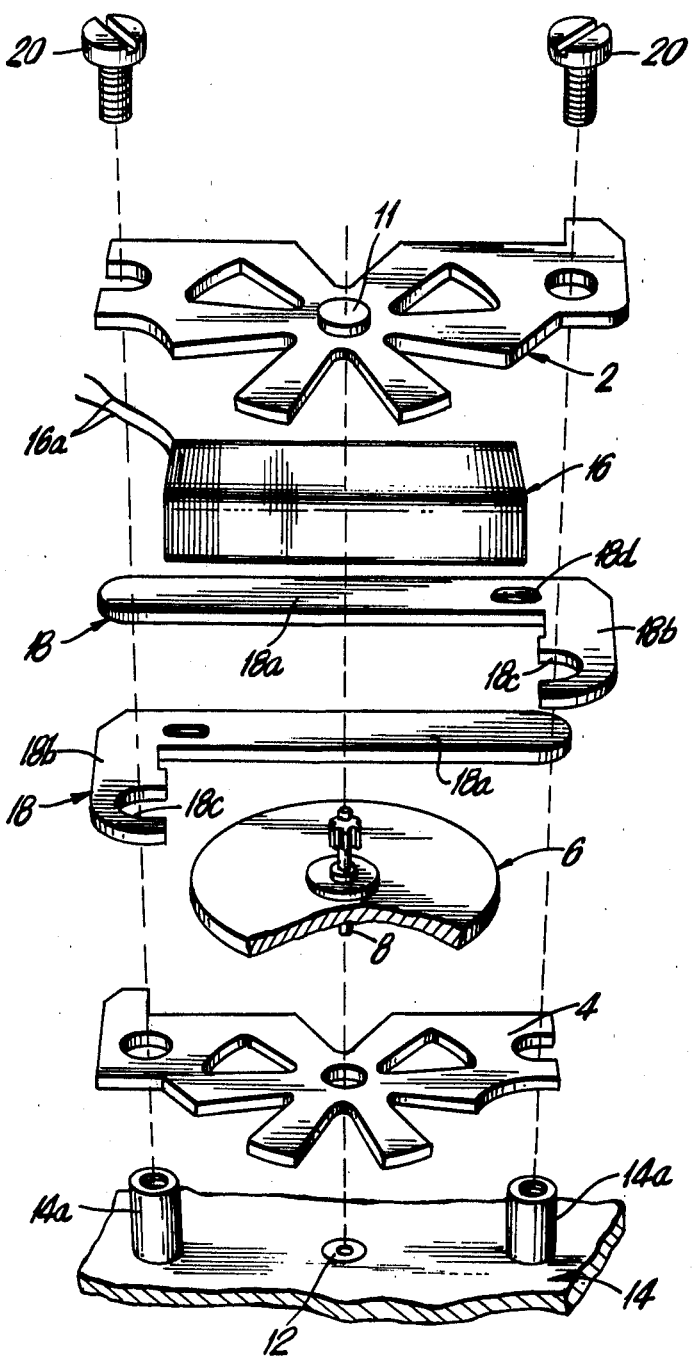
FIG. 1 is an exploded view of the components of a stepping motor.
Figure 2:
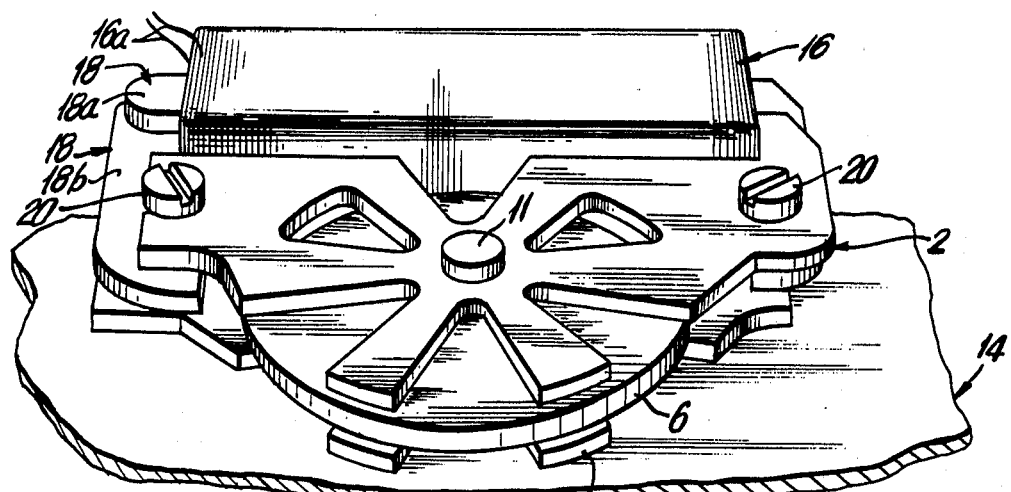
FIG. 2 is a perspective view of the assembled stepping motor.

FIG. 1 illustrates a stepping motor construction to which the present invention is applicable. Briefly, the stepping motor comprises an upper stator 2 and lower stator 4, both of magnetically permeable material, and a rotor 6 in the form of a disc of hard magnetic material having a high coercive field; e.g., a rare earth alloy. The rotor 6 is supported by a central axle 8 for rotation in the gap between the upper and lower stators. The central axle in turn is supported by upper bearing 11 in the upper stator and lower bearing 12 in the movement frame 14. A wound coil 16 which receives energizing current, for instance pulses of constant sign, is magnetically coupled to the upper and lower stators through L-shaped core members 18. The stepping motor is mounted on the movement frame 14 within a suitable housing (not shown) by means of support posts 14a and screws 20, the assembled motor being shown in FIG. 2.

The stepping motor is preferably of the type illustrated in U.S. Pat. No. 4,079,279 issued Mar. 14, 1978 to Oudet et. al. which is incorporated herein by reference.

Figure 3:
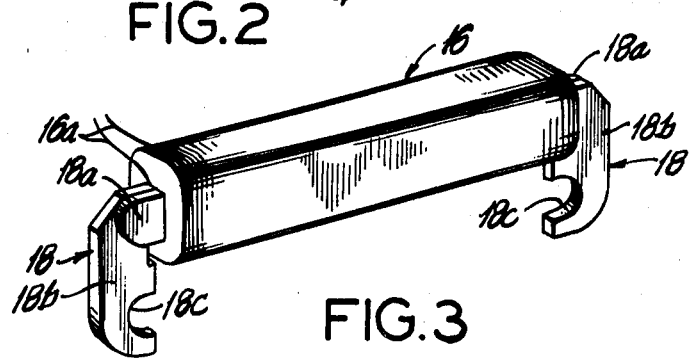
FIG. 3 is a perspective view of the coil/core assembly.

FIG. 3 shows a typical coil/core assembly wherein the long portion 18a of each L-shaped core member is inserted through the bore of the coil 16 in overlapping relation, one on top of the other, and the short portion 18b of each core member extends at a right angle to the long axis of the coil with cut-out portions 18c in facing relation. The coil 16 is made up of fine copper wire 16a (diameter 0.039 mm) covered with a thin coating of thermoplastic insulation (coated diameter 0.044 mm) e.g., Thermoplast (trademark) insulating coating material sold by Lotan Company. Preferably, coil 16 is formed on automated machinery by first heating the coated wire to a moderate temperature such as about 480° F. to place the thermoplastic insulation in the tacky condition and then winding the coated and heated wire onto an arbor such that the coating of the individual turns sticks to that on adjacent turns and becomes bonded thereto upon cooling. After the required number of turns has been wound, the tubular coil 16 is removed from the arbor and is self-supporting as a result of the thermoplastic insulating coating bonding the adjacent turns.

The insulating coating on the wire can be heated by open flame, radiant energy or other well known heating means to place it in the desired tacky condition. Typically, the tubular coil is wound to have generally rectangular outer and inner cross sections.

Figure 4:
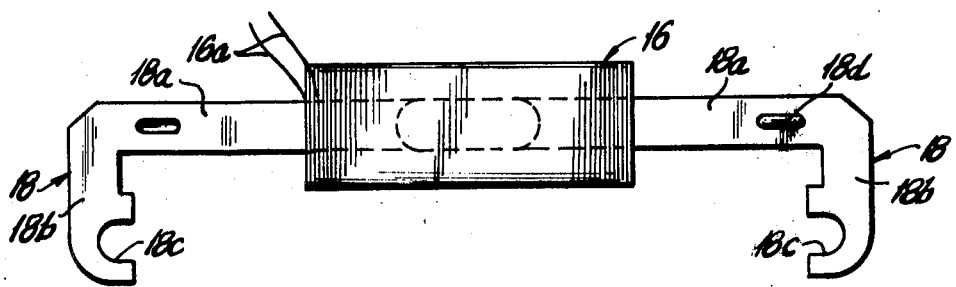
FIG. 4 is a top plan view of the coil/core assembly of the invention before full insertion of the core members.
Figure 5:
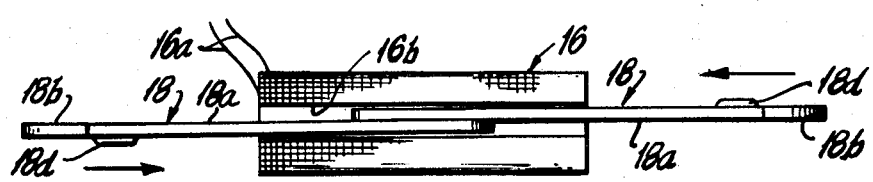
FIG. 5 is a side elevation of the coil/core assembly before full insertion of the core members with the coil in cross-section.
Figure 6:
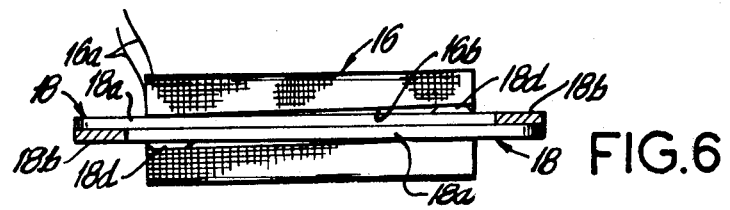
FIG. 6 is a side elevation of the coil/core assembly after full insertion of the core members with the coil in cross-section.

An important feature of the coil/core assembly of the invention is the provision of coil-engaging means on each core member. In particular, the long portion 18a of each core member includes an elongated bump 18d on the outer side of each core member facing toward the inner turns of the coil defining the bore therethrough. FIGS. 4–6 show these bumps most clearly. When the long portions 18a of the core members are inserted in overlapping relation into the bore of the coil (FIG. 6), the coil-engaging bumps 18d form an interference fit with the interior wall 16b (inner turns) of the coil at opposite ends of the bore. There is also effected an interference fit between the interior wall 16b and outer flat sides of the core members facing diametrically opposite from the bumps 18d as shown in FIG. 6. The interference fit shown is effective to hold the coil and core members together as an assembly with the core members having their overlapping inner sides in intimate contact to provide an adequate magnetic circuit. A slight tilt or angular relation of the long portions of the core members to the longitudinal axis of the bore is apparent. Elongated coil-engaging bumps are preferred to insure adequate surface contact with the inner turns of the coil, although other bump shapes may also be used.

Of course, it is apparent that the height of the coil-engaging bumps 18d is selected in relation to the height of the bore of the coil and the thickness of the long portions 18a of the core members to assure an adequate interference fit. For example, a bump of 75 microns height (plus or minus 10 microns) has provided an effective interference fit with a coil having a bore 0.940 mm plus or minus 10 microns in height and core members 0.522 mm plus or minus 13 micron each in thickness including bump. (Height of the bore of the coil being determined in a direction perpendicular to the overlapping flat sides of the core members.) The coil-engaging bump 18d is formed in conventional progression tooling by stamping or other conventional techniques.

It is also apparent that the objects of the invention may be achieved by providing one or more coil-engaging bumps on only one of the core members. For example, a pair of coil-engaging bumps may be provided in spaced apart relation on the outer side of only one core member for engaging inner turns of the coil in interference fit.

The coil/core assembly of the invention is thereafter produced in a one-step pressing operation which involves inserting the long portion 18a of each core member into opposite ends of the coil bore as shown in FIG. 4 and then pushing the core members toward one another, FIG. 5, such that the long portions 18a are overlapped and in contact with one another and the coil-engaging bumps 18d effect an interference fit with the inner turns of the coil bore. In this way, intimate contact between the overlapped core members is provided and maintained thereafter to ensure a satisfactory magnetic circuit to the stators. An important advantage of this process is that no supplemental fastening means is required to assemble the components.

Thus, it should now be apparent to those skilled in the art that the present invention provides an improved process for assembling the coil and core members in intimate contact with one another without the need for additional fastening means. The coil/core assembly thus produced is simple in construction and securely united to ensure a satisfactory magnetic circuit to the stators of the stepping motor.

While there has been described what is herein considered to be the preferred embodiment of the invention, other modifications will occur to those skilled in the art, and it is desired to cover in the appended claims all other modifications as fall within the true spirit and scope of the invention.

I claim:

1. A coil/core assembly for a stepping motor comprising an elongated coil formed of a plurality of wound turns of wire with inner turns of wire defining a longitudinal bore through the coil, and comprising a pair of flat core members, each having a long portion disposed in the bore and a short portion extending at right angles thereto disposed outside the bore, said long portions extending through the bore in opposite directions from their respective short portions with inner sides in intimate contact with one another and with outer sides facing the inner turns of the coil, the outer side of the long portion of each core member having an outwardly extending, coil-engaging bump projecting from the end thereof near its respective short portion in interference fit with the inner turns of the coil near opposite ends of the bore, whereby the core members are held in contact together and to the coil by interference fit in the bore when said long portions of the core members are fully inserted into the bore.

2. The coil/core assembly according to claim 1, wherein said short portions are adapted for attachment to stator pieces to provide magnetic coupling to the stator of a stepping motor.

3. A process for making a coil/core assembly for a stepping motor, comprising:
   (a) forming an elongated coil of wound turns of wire with inner turns defining a longitudinal bore through the coil,
   (b) providing a pair of core members, each having a long portion to be inserted through said bore and a short portion disposed at right angles thereto, said long portions each having an inner side and an outer side with a coil-engaging bump projecting outwardly from the outerside on the end thereof near its respective short portion, and
   (c) inserting said core members into opposite ends of the bore with inner sides facing one another and outer sides facing the inner turns of the coil to bring the coil-engaging bump of each core member into interference fit with inner turns of the coil, whereby the core members are held in contact together and to the coil by interference fit in the bore near the ends of the coil when the core members are fully inserted.

4. The process of claim 3, further including the step of:

(d) connecting the short portions of each core member to stator pieces to provide magnetic coupling to the stator of a stepping motor.

* * * * *